INVENTOR
RENE A. FIECHTER
BY
Nolte & Nolte
ATTORNEYS

April 14, 1970 R. A. FIECHTER 3,505,742
INDICATOR DEVICE FOR CONTINUALLY MONITORING DEVIATIONS FROM
THE CORRECT ELEVATION AND GAUGE OF RAILROAD TRACKS
Filed Dec. 4, 1968 4 Sheets-Sheet 2
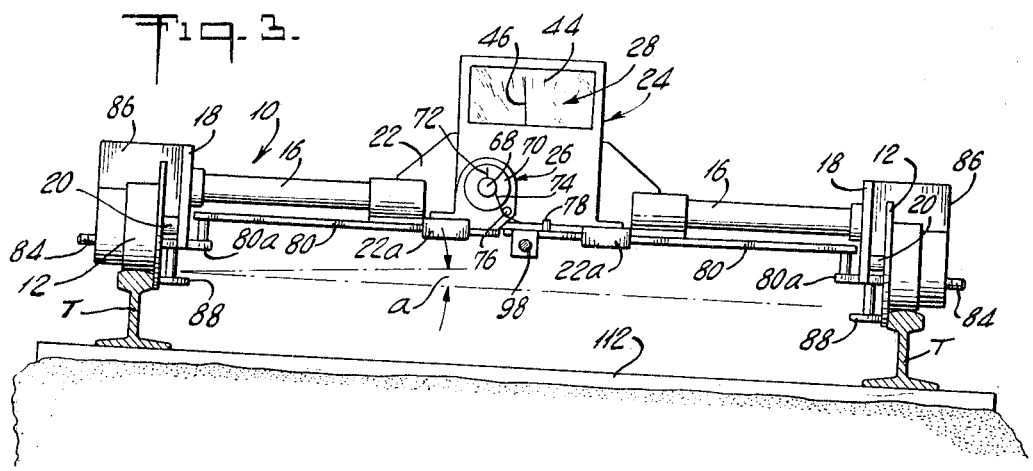
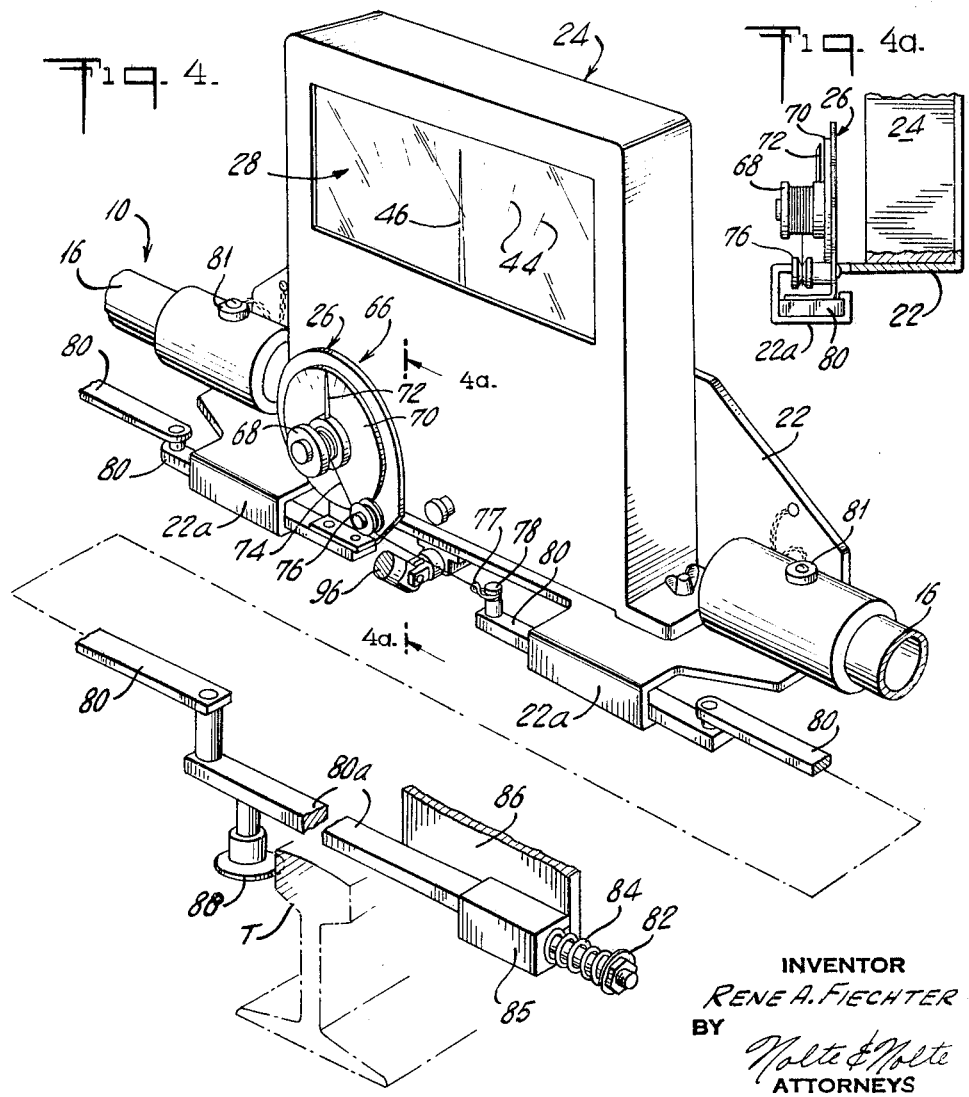
INVENTOR
RENE A. FIECHTER
BY
Nolte & Nolte
ATTORNEYS

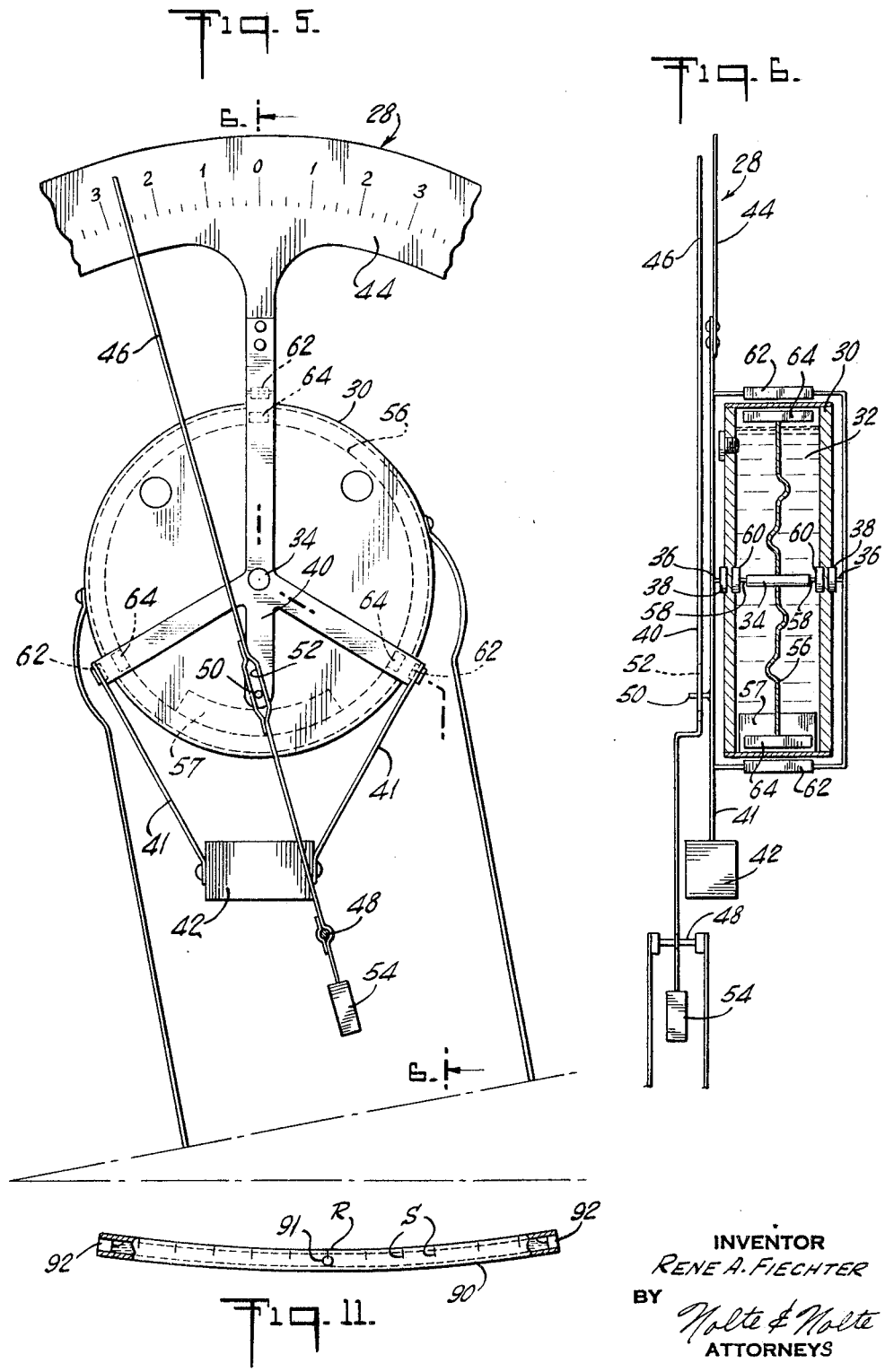

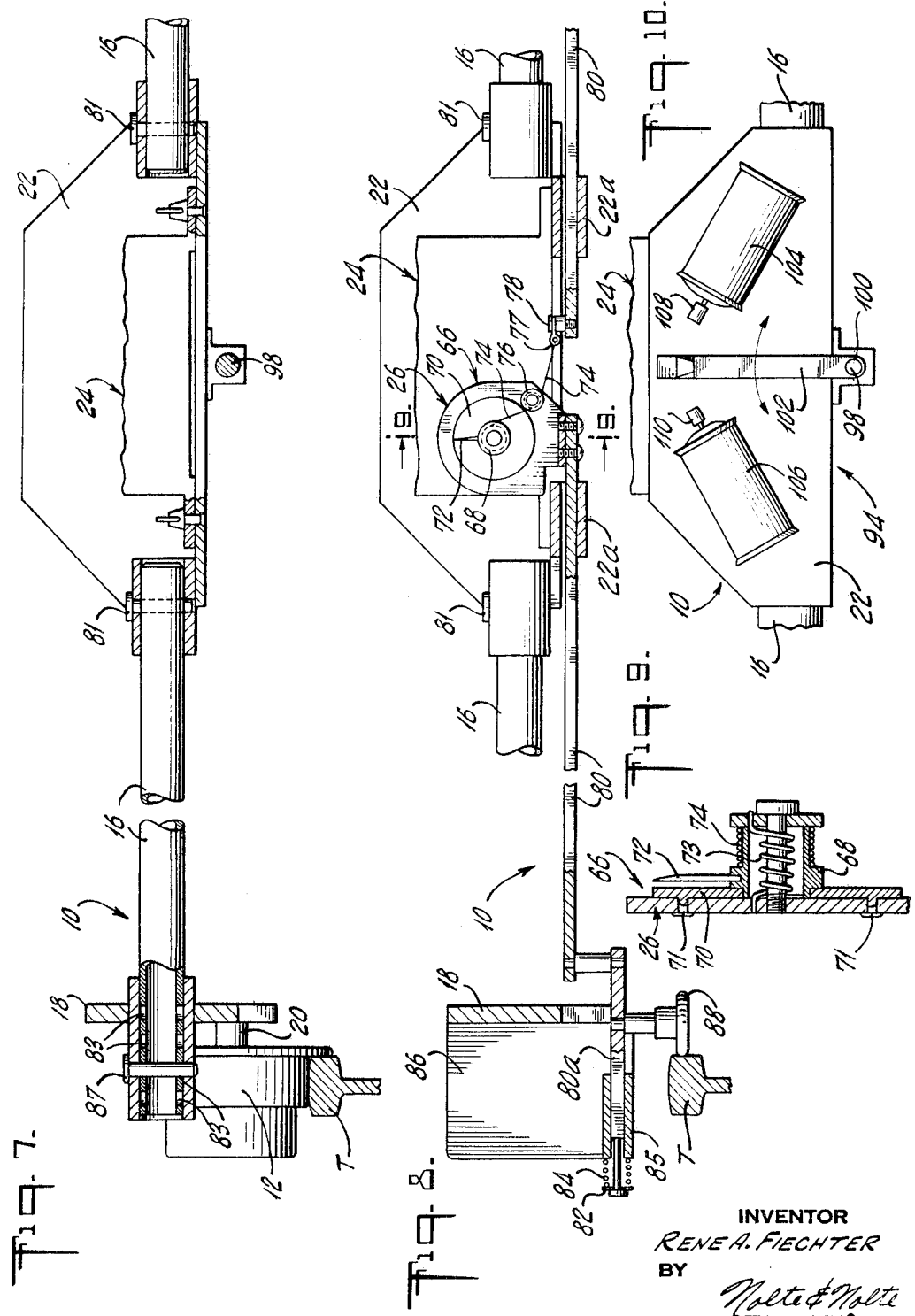

United States Patent Office 3,505,742
Patented Apr. 14, 1970

3,505,742
INDICATOR DEVICE FOR CONTINUALLY MONITORING DEVIATIONS FROM THE CORRECT ELEVATION AND GAUGE OF RAILROAD TRACKS
Rene A. Fiechter, 137 Hollywood Ave., Douglaston, N.Y. 11363
Filed Dec. 4, 1968, Ser. No. 781,215
Int. Cl. B61k 9/08
U.S. Cl. 33—145    8 Claims

ABSTRACT OF THE DISCLOSURE

An indicator device being transported on railroad tracks for continually monitoring the elevation or cross-level and gauge of the tracks, and marking areas by means of aerosol spray cans where faulty elevation and gauges are detected. The device utilizes two pendulums, one of which is in a liquid medium in a housing, the other pendulum being located outside of the housing. The device may be disassembled and made portable.

BACKGROUND OF THE INVENTION

Field of the invention

The present invention relates to a device for continuously and rapidly monitoring the differences in elevation between the rails on railroad tracks. The compact device can be carried manually or transported in a vehicle along the railroad tracks.

SUMMARY OF THE INVENTION

An object of the present invention is to provide a railroad track elevation indicator which permits reading both quickly and accurately the relative elevation of one rail with respect to the other, without being affected by shocks and vibrations of the vehicle on which it is installed. The indicator is in the form of a meter wherein the indicating needle moves in opposite direction to the scale thereby increasing greatly the magnification of the reading. However, it is within the scope of the present invention to make the scale fixed and mount the needle for movement, thereby affording easier reading of the meter.

Another object of the present invention is to provide a means for continuously measuring track gauge and an indicator dial to show deviations in said gauge.

A further object of the present invention is to provide a marking means, which when the indicators for either or both elevation and gauge go outside the preset tolerances, mark the precise spot where the defect occured so that a track gang subsequently can easily find the defects in the track and make corrections thereto.

It is well known that it is of great importance to continuously and rapidly check the superelevation of track rail for reasons of safety and economy. It should be noted that the device monitors the difference in elevation between the rails, whether on a curve where the track is supposed to bank or on a straightaway where the rails should be the same elevation. In a present known device, a bubble level is used which is slow, and thereby costly, since it requires the operator to stop at a given spot and to adjust the bubble to fit in between the lines, and thereafter make a reading. It should be apparent that this device cannot be used or adapted for continuous reading of elevation. However, in the interests of economy, a novel liquid-filled gauge is herein disclosed which has a greater accuracy than previously known gauges of this type. On the other hand, the present invention utilizes an indicating pendulum together with another pendulum having means for damping its oscillations. This arrangement instantly dampens lateral shocks transmitted to it from the tracked vehicle.

BRIEF DESCRIPTION OF THE DRAWINGS

Further features and objects of this invention will be described in more detail in the following specification and the appending drawings, wherein:

FIG. 3 is a front elevation view thereof;

FIG. 4 is an enlarged perspective fragmentary view of details of the construction thereof;

FIG. 5 is a front elevation view of the scale device, partially broken away, which illustrates my novel dual pendulum construction;

FIG. 5a is a section taken on lines 5a—5a of FIG. 4;

FIG. 6 is a sectional view taken along the lines 6—6 of FIG. 5;

FIG. 7 is a view taken along the lines 7—7 of FIG. 2;

FIG. 8 is a view taken along the lines 8—8 of FIG. 1;

FIG. 9 is a view taken along the lines 9—9 of FIG. 8;

FIG. 10 is an elevation view of the marking device constituting a further part of the present invention; and FIG. 11 is an alternate embodiment of the scale device shown in FIG. 5.

Figure 1:
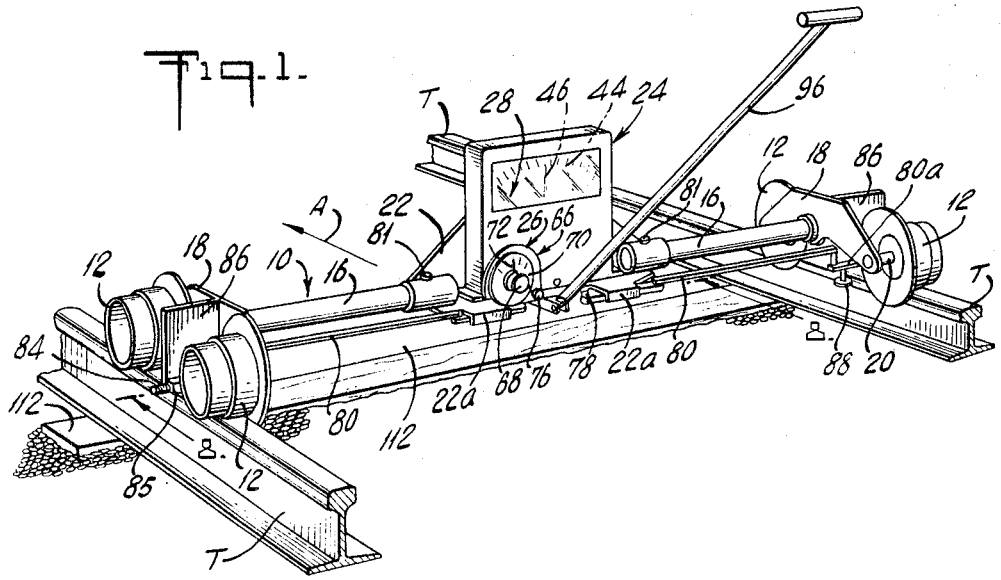
FIG. 1 is a front perspective view of the device for monitoring deviations from the correct elevation and guage of the rails of a railroad track.

Referring to the drawings, the indicator device constituting the present invention comprises a carriage referred to generally by the numeral 10 and is provided with wheels 12 that engage the tracks T and move in the direction of the arrow A. The carriage herein shown is adapted to be pushed by hand, however it is within the scope of the present invention to make the carriage self-propelled such as, a self-jacking tamper, trackscoot or motorcar, and having an operator riding thereon.

The carriage 10 is provided with cross-rods 16 which are connected at one end to structural members 18 supporting the axles 20 of the wheels 12. The cross rods 16 are each connected at their opposite ends to a support 22 having a meter 24 mounted thereon. Slidable within a bearing surface 22a of support 22 is a gauge dial 26 which is a direct read indicator of the track gauge. The meter 24 is provided with a cross-level indicator 28 which indicates the relative elevation of one track rail in relation to the other track rail. For example, the amount of superelevation between rails can be seen by the dimension a of FIG. 3.

Referring to the cross-level indicator 28 in particular, and especially FIGS. 5 and 6 of the drawings, there is shown a sealed housing 30 having a liquid medium 32 therein. A shaft 34 is located in the housing and is suspended on two pivots 36 in jewelled bearings 38. A pendulum 40 is mounted and swings on shaft 36, said pendulum having arms 41. The dual-armed pendulum 40 is further provided with a weight 42 at the lower end thereof. At the upper end of pendulum 40 is a scale 44 fixed thereto for direct reading of angular variations. The scale 44 is of the type that seeks the vertical position at rest inasmuch as there is no damping provided therefor. A relatively light-weight needle pointer 46 for the scale 44 is provided with a jewelled pivot 48 actuated by a roller 50 fixed on pendulum 40 and having the free end thereof passing through an elongated opening 52 in the needle pointer 46. The needle pointer 46 is provided with a weight 54 at its extreme lower end. Thus, the needle pointer 46 moves on the roller 50 and in the opposite direction to the movement of the scale 44. Therefore, the magnification of the reading is increased by the present construction in which angular variations from 1 minute up to 10 degrees can be read on the scale.

The present cross-level indicator is damped by another pendulum 56 having a weight 57 and mounted on the same shaft 34 that pendulum 40 is mounted on, but on its own pivots 58 in jewelled bearings 60. The oscillations of pendulum 56 are damped by the liquid medium 32 in the sealed housing 30. The period of the pendulum 56 is made to be approximately one-half of the period of the pendulum 40. Furthermore, both the pendulums 40 and 56 are provided with permanent magnets 62 and 64 respectively which face each other in a space-confronting manner. Accordingly, the damping of pendulum 56 is magnetically transferred to pendulum 40, the difference of periods creating a very strong damping effect on the whole system which can only find its full sensitivity when in equilibrium. Pendulum 56 swings on its own pivots 58 and has the same position of equilibrium as pendulum 40, and because its pivots 58 are in jewelled bearings 60 the friction of a joint does not have to be overcome. Thus, pendulum 56 is fully sensitive and does not affect the accuracy of pendulum 40.

Referring now to the device for continually measuring the gauge of the rail tracks T and shown especially FIGS. 7-9, the gauge meter 66 is clearly seen in FIGS. 1, 3, 4 and 9. The meter 66 is provided with a spool 68 which is rotatable on dial plate 70 as well as gauge dial carriage plate 26. As seen in FIG. 5a, it should be noted that the carriage plate 26 and dial plate 70 are rigidly connected together by fastening means 71, and both are mounted on a connecting rod 80 which is slidable in a bearing surface 22a. The spool 68 is provided with a pointer 72 and a helical return spring 73. The helical return spring 73 continually biases the spool 68 with its pointer in a counter-clockwise direction. One end of flexible cable 74 is secured to the spool 68 and is adapted to wind and unwind about the spool. The cable 74 passes under guide roller 76 and is affixed at its other end 77 to threaded stud 78 on the right-hand fixed connecting rod 80. As seen in FIGS. 4 and 8, the connecting rod is shown in several interconnected sections including an end portion 80a. The extreme end of portion 80a is provided with an abutment cap 82 which has a helical spring 84 captured between the cap and the sleeve 85 of plate 86 secured to structural member 18. Portion 80a of connecting rod 80 is also provided with a fixed roller 88 which yieldably engages the side of track T. Thus, the fixed roller 88 yieldably engages one side of track T and thereby the rod 80, as seen on the left hand side of FIG. 8, is moved to the right or the left depending on the gauge track to be measured. Consequently, the movement of connecting rod 80 caused by the horizontal movement of the measuring plate 86 is transmitted through the connecting rod 80 to move the carriage plate 26, dial plate 70 and spool 68 with the pointer 72 thereon. If the movement of the left hand rod 80 is to the right then the cable 74 is slackened due to the narrowing of the distance between the two rods 80 and the spool 68 will move counter-clockwise due to the bias of spring 73 and thereby cause limited windup of the cable 74 on the spool 68. On the other hand, if the movement of the left hand rod 80 is to the left the distance between the rods 80 is increased and the cable 74 is tightened thereby rotating the spool 68 clockwise against the pressure of spring 73 and thereby cause limited unwinding of the cable 74 on the spool 68. The other connecting rod 80 on the opposite side of the gauge dial carriage plate 26 may be either fixed or movable and, if movable, would have the same construction as connecting rod 80 and associated structure set forth hereinabove. Therefore, it should be apparent that any relative motion of the connecting rod due to variation in the track gauge would automatically cause a dial reading on the gauge dial carriage plate 26. It is within the scope of the present invention to utilize other means of causing the gauge to move in response to movement of the connecting rod, such as a rack and pinion arrangement (not shown).

FIG. 7 illustrates the feature of the adjustability of cross rods 16 which are mounted on support 22 by pins 81. The other ends of each of the cross rods 16 are provided with a series of spaced holes 83 through which pins 87 are selectively placed. This adjustable feature permits the distance between the wheels 12 to be adjusted so that they are seated on the tracks and roughly correspond to the gauge of the tracks. Of course, the connecting rod 80, wheel 88 and spring 84 make the final adjustment for the track gauge. In addition, it should be noted that the wheel pairs 12 cross rods 16 and the meters 24, 66, together with all the accessory structure, may be easily disassembled by removing pins 81 and 87 and packing the disassembled parts in a portable container or containers.

In place of the cross-level meter 24, an inexpensive simple arrangement may be used to continually monitor the track elevation. This may be seen in FIG. 11 in which a tube 90 of transparent material, i.e., glass or Lucite, is slightly bowed and has a scale S. The tube 90 is filled with a fluid such as oil or silicone and a ball 91 placed therein. The tube is then closed at both ends by plugs 92. The ball 91 is preferably a blackened steel ball and rolls in the tube 90 from its rest position of R to either side depending upon the angular tilt of the carriage 10. The scale S is preferably in inches and the fluid damping effect on the ball results in acceptable accuracy.

Figure 2:
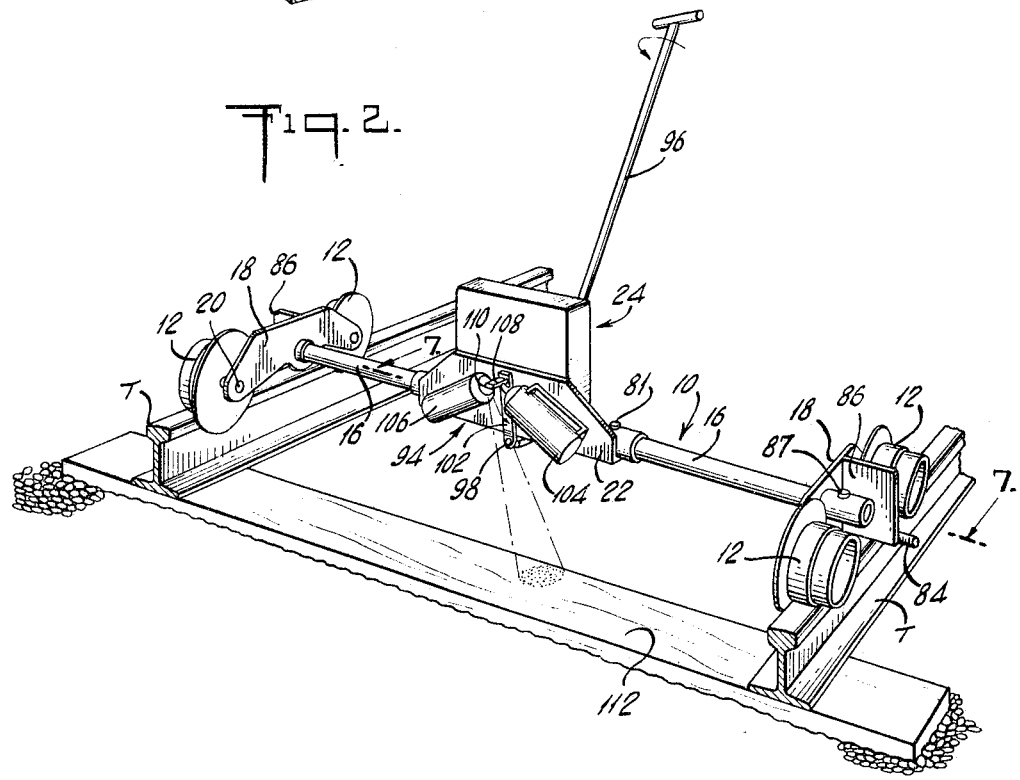
FIG. 2 is a rear perspective view thereof.

The present indicator device is further provided with a marking means referred to generally by the reference numeral 94, and particularly illusrated in FIGS. 2 and 10. The marking means 94 is activated by the handle 96 which can be selectively turned to either the left or right. The handle 96 is fixed to a shaft 98 which rotates in a bearing 100.

An upright bar 102 is secured to the shaft 98. Secured to the rear surface of the support 22 are aerosol paint containers 104 and 106 which are angularly located relative to the carriage 10. Preferably the container 104 has paint of a different color than the paint in the container 106. Thus, the upright bar 102 is moved to either the right or left when the operator rotates handle 96, and as a result of the selected movement, the bar 102 strikes the release valve 108 or 110 of containers 104 or 106, respectively, to thereby release the pressurized paint in the selected can and spray the ties 112 or the track bed. Accordingly, the defective area of the track may be located immediately by track gangs and the color of the paint indicates whether the track defect is in elevation or in gauge.

What is claimed is:

1. An indicator means for monitoring deviations from the correct superelevation of the rails of a railroad track comprising a vehicle adapted to ride on said track, a housing mounted on said vehicle and containing a liquid therein, a shaft projecting through said housing, a first pendulum mounted on said shaft but exterior of said housing, said pendulum being provided with a scale, a second pendulum mounted on said shaft but in the interior of said housing whereby the oscillations thereof are damped by the liquid medium in said housing, and a needle pointer swingably mounted on said first pendulum, said needle pointer moving in the opposite direction to the movement of said scale thereby increasing the sensitivity of said indicator means.

2. An indicator means for monitoring deviations from the correct superelevation of the rails of a railroad track as claimed in claim 1 further comprising at least one permanent magnet on said first pendulum and at least one permanent magnet on said second pendulum, said permanent magnets being adjacent and facing each other whereby the damping of the second pendulum is magnetically transferred to the damping of the first pendulum.

3. A device as claimed in claim 3 further comprising a marking device, and means for selectively actuating said marking device to separately mark the track area that has deviations in the correct elevation and/or gauge.

4. A device as claimed in claim 3 wherein said marking device constitutes two aerosol paint spray containers removably mounted on said carriage in a manner whereby when each container is actuated the respective paint spray is directed downwardly, and a manually operated striker bar for selectively engaging the release valve of alternate paint spray containers for spraying paint downwardly as a marking device.

5. An indicator means as claimed in claim 1 further comprising said vehicle having a carriage and two pairs of wheels, means mounting said indicator means on said carriage, a cross-rod removably connecting each pair of wheels to said carriage, and pin means adjacent to the wheels and the carriage for removably connecting said wheel pairs to said carriage and disconnecting the same whereby the carriage, wheel pairs and cross-rods become portable.

6. An indicator means as claimed in claim 1 further comprising an additional indicator device for monitoring the correct gauge of said rails and mounted on said vehicle, means engaging said rails and moving in accordance with the relative distance between said rails, said means including a spring-biased connecting rod, said indicator device being movable with said connecting rod and including a spool provided with a needle and a cable wound about said spool and secured at the other end to a fixed location whereby movement of said connecting rod results in movement of said needle, a fixed wheel mounted on said connecting rod and engaging one side of at least one of said rails whereby lateral movement of said fixed wheel is transferred to said connecting rod to thereby display a visual reading on said indicator device.

7. An indicator means for monitoring deviations from the correct superelevation of the rails of a railroad track comprising a vehicle adapted to ride on said track, a housing mounted on said vehicle and containing a liquid therein, a shaft projecting through said housing, a first pendulum mounted on said shaft but exterior of said housing, said pendulum being provided with a scale, a second pendulum mounted on said shaft but in the interior of said housing whereby the oscillations thereof are damped by the liquid medium in said housing, and a needle pointer swingably mounted on said first pendulum relative to said scale.

8. A device for monitoring deviations from the correct elevation and gauge of the rails of a railroad track comprising a vehicle provided with a carriage and wheels engaging said tracks, said vehicle being adapted to be moved along said tracks, a first indicator device on said carriage and responsive to the elevation of said rails with respect to each other to continually record the superelevation of said tracks, a second indicator device being mounted, said carriage having means for measuring the distance between said rails thereby continually indicating the track gauge, said first indicator device including a housing mounted on said carriage and containing a liquid therein, a shaft projecting through said housing, a first pendulum mounted on said shaft but exterior of said housing, said pendulum being provided with a scale, a second pendulum mounted on said shaft but in the interior of said housing whereby the oscillations thereof are damped by the liquid medium in said housing, and a needle pointer swingably mounted on said first pendulum, said needle pointer moving in the opposite direction to the movement of said scale thereby increasing the sensitivity of said indicator means.

References Cited

UNITED STATES PATENTS

| | | | |
|---|---|---|---|
| 143,287 | 9/1873 | Kayser | 33—146 |
| 747,872 | 12/1903 | Ellis et al. | 33—146 X |
| 824,536 | 6/1906 | Ellis et al. | 33—146 |
| 883,685 | 4/1908 | Barceloux | 33—146 X |
| 1,190,796 | 7/1916 | Pollard | 33—145 |
| 1,703,289 | 2/1929 | Blair et al. | 33—145 |
| 3,126,640 | 3/1964 | Plasser et al. | 33—145 |
| 3,381,383 | 5/1968 | McIlrath | 33—146 |

FOREIGN PATENTS

| | | |
|---|---|---|
| 466,135 | 2/1914 | France. |
| 679,655 | 1/1930 | France. |
| 679,865 | 1/1930 | France. |

HARRY N. HAROIAN, Primary Examiner

PO-1050
(5/69)

UNITED STATES PATENT OFFICE
CERTIFICATE OF CORRECTION

Patent No. 3,505,742              Dated April 14, 1970

Inventor(s) Rene A. FIECHTER

It is certified that error appears in the above-identified patent and that said Letters Patent are hereby corrected as shown below:

Column 4, line 72, after "claim" change "3" to -- 1 --.

SIGNED AND
SEALED
AUG 18 1970

(SEAL)
Attest:

Edward M. Fletcher, Jr.
Attesting Officer

WILLIAM E. SCHUYLER, JR.
Commissioner of Patents